July 22, 1924.
H. J. MURRAY
1,502,345
GEAR SYNCHRONIZER
Filed Aug. 16, 1922
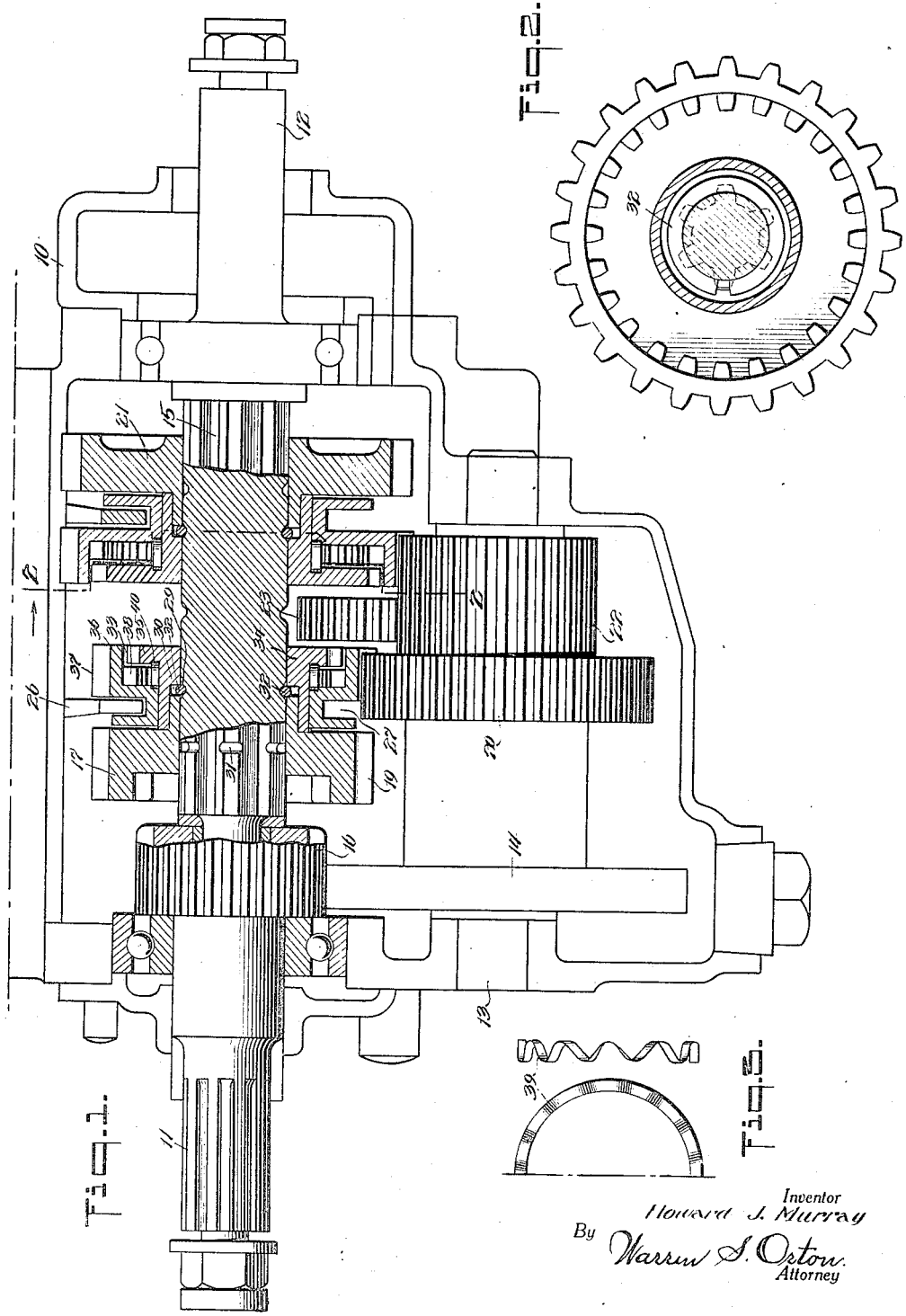
Inventor
Howard J. Murray
By Warren S. Orton
Attorney Patented July 22, 1924.

1,502,345

UNITED STATES PATENT OFFICE.

HOWARD J. MURRAY, OF NEW YORK, N. Y.

GEAR SYNCHRONIZER.

Application filed August 16, 1922. Serial No. 582,168.

*To all whom it may concern:*

Be it known that I, HOWARD J. MURRAY, a citizen of the United States, and resident of New York city, in the county of Kings and State of New York, have invented certain new and useful Improvements in Gear Synchronizers, of which the following is a specification.

The invention relates in general to a variable speed power transmission mechanism of the gear shift type and in which the power driven and the load carrying gears are co-ordinated through the interposition of a clutch so that the gears will assume a speed of rotation equal to each other before the power gears are moved into meshed position. The invention specifically relates to that type of gear synchronizing mechanism in which the actuation of a single, manually-operated control member moving in one direction causes the gears to be connected initially through the medium of a clutch and the continued movement of which control member will cause an intermeshing of the power gears in their direct driving relation.

The present application constitutes one of a series of pending applications and constitutes another embodiment of the invention disclosed in the previously filed applications, to-wit: Serial No. 548,235, power transmission mechanism, filed March 30, 1922; Serial No. 548,237, sliding clutch gear synchronizer, filed March 30, 1922; and Serial No. 548,236, clutch ring synchronizing device, filed March 30, 1922.

In application Serial No. 548,235 the specific form of clutch selected for illustration was of the friction type including an internal band with concentrically disposed clutching members and in which the clutching movement takes place radially of the axis of rotation of the intermeshing gears. In application, Serial No. 548,237 there was illustrated a different form of friction clutch in which the movable element is shiftable to and from its clutching engagement with one of the power gears in a direction axially of the shaft which carries the same.

The present disclosure features the same advantages such as simplicity in structural design; ease of control in operating the same; positiveness of actuation and ready substitution of the corresponding gear unit in transmission casing of conventional structure, as is featured in the above identified companion applications.

Another object of the invention is to provide a simple means, differing from the means shown in the preceding applications for insuring the proper meshing of the synchronizer gear with the co-related power gear without danger of stripping the teeth of either gears.

The present disclosure has for additional objects the providing of a simple form of clutch connection which will insure a positive, prompt and non-slipping drive between the power gears, so that they will assume the same speed prior to their intermeshing engagement, or, stated in another way, when considered in connection with such structures used on automobile power plants. An object of the invention is to provide a simple structure for promptly jerking the jack shaft to the speed of the propellor shaft prior to effecting the meshing of the prior gears.

Stated differently an object of the invention is to effect an easy meshing of automobile power plant transmission gears to provide for the shifting into first, intermediate and reversed speed the same ease of action characterizing the present shifting of the gears to attain high or direct drive, and at the same time to eliminate possibility of gear stripping in effecting such low speed or reverse speed driving connections.

Broadly I attain these objects by providing as in the prior applications a synchronizing gear, carried by one of the power gears and in mesh with the other gear but differing from the prior disclosures by providing a simple, mesh tooth gear clutch between the synchronizing gear and the power gear upon which it is mounted.

Another object of the invention is to provide a simplified form of gear shifting control which will lock the gears in their desired meshing relation against accidental movement out of such positions.

Incidental to this object it is a desideratum of the invention to eliminate the locking lugs usually found in connection with the gear shifting rods in automobile transmission casings. In this connection the present disclosure features the utilization of one set of locking means on the transmission shaft for the dual purpose of locking the shiftable gear in its final set position as well as to lock the relatively fixed member of the gear clutch constituting part of the synchronizing mechanism.

Still another object of the invention is to provide a simple means for restoring the clutch part automatically into its normal inoperative position following the movement of the shiftable gear into its inoperative position by the actuation of the manual control.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a sectional view taken axially of the power shaft through a transmission casing of conventional form equipped with a preferred embodiment of the inventive features herein disclosed and also constituting a modified form of the inventive features disclosed in the above identified applications;

Figure 2 is a transverse sectional view taken approximately on the line 2—2 of Figure 1; and Figure 3 is a compound view showing in plan and in edge view approximately one half of the clutch re-setting ring shown in Figures 1 and 2.

In the following description and in the claims, parts will be identified by specific names for convenience of expression but they are intended to be as generic in their application to similar parts as the art will permit.

The invention is herein described in connection with a variable speed transmission of the conventional slide gear type which has been selected to illustrate the adaptability of the invention to an organization driving numerous gears but it is obvious that the invention may be applied to any situation in which gears or other driving mechanism are to be moved to and from a meshed or driving position.

In the drawings there is shown a containing casing 10 for housing the several parts and for providing bearings for the several shafts and shift rods entering therein. Further for the purpose of showing the applicability of this invention to an automobile engine construction it will be considered that the shaft 11 is a power shaft operatively connected with the engine shaft of an automobile and that the shaft 12 is a propeller shaft operatively connected to drive the traction wheels of an automobile.

The propeller shaft projects into the casing in alignment with the power shaft and has certain portions thereof non-circular in cross-section to accommodate the combined sliding gear and clutch units hereinafter described. A counter-shaft 13 provided with a main drive gear 14 adjacent one end is rotatably mounted within the casing and parallels the encased non-circular portion 15 of the propeller shaft. The gear 14 is constantly in mesh with a main driving gear 16 fixed to the power shaft 11 so that the countershaft is constantly connected to be driven from or to drive the power shaft. A sliding gear unit 17 is keyed to the shaft 15 so as to rotate therewith, and is designed to mesh with the gear 16 to provide a direct drive between the shafts 11 and 12.

The gear unit 17 is also provided with external teeth 19 hereinafter referred to as a driven gear and adapted, when meshed with a gear 20 keyed to the countershaft and hereinafter referred to specifically as a driving gear, to obtain second speed. Another gear 21 keyed to and slidably mounted on the shaft portion 15 is designed in one shifted position to mesh with a gear 22 on the countershaft to obtain first speed and in another shifted position to mesh with an intermediate gear 23 to obtain reversed speed. A longitudinally shiftable control rod is connected by means of a laterally extending yoke arm 26 working in a groove 27 to control the gear unit 17 and a corresponding rod is similarly connected to the sliding gear unit 21 so as to move the same into mesh to obtain first speed or to obtain reverse speed.

The construction as thus far described is of conventional design and has been illustrated in some detail simply to show that the inventive features herein claimed can be readily installed in a transmission casing of approved form.

In the following description particular reference will be made to the synchronizing of gears 19 and 20 but it will be understood that the invention with obvious mechanical changes can be adapted for use in other locations and as an illustration of one such use reference is made to the first speed and reverse speed synchronizing arrangement shown at the right side of Figure 1.

The unit 17 is provided with an extension from one side constituting a hub 29, preferably formed in two telescoping parts and shrunk one on the other so as to form a unitary piece. The parts are spaced so as to form a locking spring retaining groove 30 therebetween and facing the transmission shaft. The portion 15 of the transmission shaft is provided with five longitudinally spaced apart locking grooves 31 into which extend a split ring spring 32 for the purpose of holding the unit 17 in its shifted position when in neutral and when in mesh with the corelated power gear and for the purpose of holding the relatively fixed element of a synchronizing clutch 33 hereinafter more fully described. The end portion of the hub remote from the power gear is enlarged to form an end disk 34, the periphery of which is machined to provide a spur pinion 35 constituting the relatively fixed element of tooth clutch. An annular band 36 hereinafter referred to as a synchronizer is rotatably mounted upon the hub of the unit 17 and is disposed between the spur gear and the pinion 35. In the form of the invention herein disclosed the synchronizing gear overlaps the pinion 35 in order to economize space longitudinally of the shaft. The groove 27 for shifting the unit 17 is contained in the synchronizer and the synchronizer is provided on one side of the groove with a spur gear 37 hereinafter referred to as a synchronizing gear constantly in mesh, when the unit is in neutral position, with the jack shaft gear 20 (or 22). The inner periphery of the synchronizing gear is provided with internal gear teeth 38 which are designed to be moved edgewise, that is parallel to the axis of the shaft, into engagement with the pinion teeth and thus the internal gear 38 constitutes the movable element of the gear clutch featured in this disclosure. The clutch parts are normally maintained in inoperative position, with the teeth of the pinion and gear unmeshed, by means of a corrugated annular spring 39 which is in the form of a split ring with the ends spaced apart such a distance that when the spring is flattened the ends will almost touch. This spring is disposed in recesses 40, cut into opposite faces of the synchronizer and pinion 35.

It is readily appreciated that this declutching spring is not vital to the operativeness of the invention herein disclosed, and that the clutch part may be moved into inoperative position by other means, such for instance as a spring plunger or the movement of the clutch to and from its operative position may be controlled solely by the usual shift lever which must anyhow bring the parts to neutral position before effecting a new resetting of the gears.

The fork members 26 are intended to be secured to shifting forks not shown, mounted respectively on a low shift rod and on a high shift rod designed to be engaged by a universally mounted shift lever. It will be understood in general that these parts are of conventional form except that there has been omitted the usual locking means for engaging notches in the shift rods to lock the gears in their shifted and neutral positions. As this function is attained by the use of the locking rings 32 constituting part of the synchronizing mechanism hereinbefore described there is no necessity for the use of any separate locking means and accordingly this part of the structure is simplified and thus rendered cheaper in manufacturing cost.

In operation and assuming that it is desired to move the gears 19 and 20 from their unmeshed position shown in Figure 1 into their fully meshed position as is usual in providing for a second speed drive, the shift lever is moved from the neutral position so as to move the yoke 26 as is usual in shifting gears in known constructions. The initial movement of the shift lever will cause the synchronizer to slide towards the right on the gear unit 17. At this time the gear unit as a whole is held by the engagement of its locking spring 32 in the second series of notches 31 (as shown in Figure 1) and as this spring 32 is stronger than the spring 39 the spring 39 will give flatwise distorting towards a flat shape. Overcoming the resistance of the weak spring 39 will permit the intermeshing of the gear 38 with the pinion 35 and in this way the clutching connection between the synchronizer and the power gear 19 will be completed.

Assuming, as will be usually the case, that the propeller shaft 12 is revolving at high speed, it will act through the gear unit 17 through the meshed synchronizer and through the gear 20 to jerk the jack shaft to the speed of the propeller shaft. As the jack shaft is geared to the power shaft 11 the result will be that the shaft which is designed to be clutched to the engine shaft is jerked to the speed of the propeller shaft as soon as the clutch is effective. There is thus provided a positive, non-slipping driving connection between the propeller shaft and the power shaft prior to the intermeshing of the transmission power gears.

With the continued movement of the shift lever the pressure thereof acting through the synchronizer onto the slidable unit will overcome the holding resistance of the spring lock engaging the transmission shaft and thus permit the shifting gear unit to move its gear 19 into meshing engagement with the gear 20 both gears being at the same speed. As the sliding unit is moved along, the gears are fully meshed and preferably the parts are so constructed that with the power gears in meshed position the synchronizer gear has moved beyond the power gear and out of engagement with the same. When the power gears are finally meshed the lock spring 32 will expand into the adjacent set of grooves 31 and thus act to lock the gears in their present meshed position. Releasing pressure on the shift lever will permit the unclutching spring 39 to restore itself into its normal, corrugated position thus acting to shift the synchronizer into normal position and at the same time to move the gear clutch into its normal, inoperative position.

Moving the shift lever into neutral position acts in the opposite direction on the fork 26, which in turn acts through the synchronizer onto the gear unit to restore the same into the normal position such as is shown in Figure 1 and the device is in position to have any of its gear combinations reset.

By means of the device disclosed it is possible to provide an extremely simplified form of gear synchronizer which will insure the meshing of any of the gear sets at all speeds and without the possibility of stripping the power gears. The disclosure features simplicity of construction; the minimizing of parts necessary to form the synchronizer and a form of synchronizer which is not dependent upon a friction type of clutch and therefore is of particular value for use in connection with automobile trucks where the gears must be shifted frequently and usually under circumstances where the propeller shaft is turning at high speed and under high torque. The operation of the device does not require any particular skill for the shift lever is manipulated as is usual with similar construction not equipped with synchronizers, and no care need be exercised in shifting the lever.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination of a pair of gears adapted to be shifted into a driving relation, one of said gears provided with a pinion constituting an element of a tooth clutch, a coacting clutch element carried by said gear provided with a gear meshing with the other of said pair of gears and provided with a coacting pinion adapted to be moved into mesh with said first named pinion and control means including a shift lever movable in one direction for causing in sequence a meshing of the pinions and then a meshing of said pair of gears.

2. In a transmission gearing, the combination of a shaft, a gear slidable axially on said shaft means for securing the gear against accidental lengthwise movement on said shaft, a second gear slidable with the first gear and mounted to rotate relative thereto, a gear drive for securing the gears positively to rotate together free of relative rotary movement and a control for said gear drive and for causing said slidable gear to overcome said securing means and thus permit it to engage the second gear.

3. In a transmission gearing, the combination of a shaft, a gear synchronizer slidable axially of the shaft, said synchronizer including a synchronizing gear and a pinion constituting one element of a gear clutch, a power gear on said shaft provided with a pinion constituting the coacting element of the gear clutch and means in direct engagement with the slidable synchronizer for controlling the clutch.

4. In a device of the class described, the combination of a pair of gears slidable axially relative to each other to and from a meshing position, a synchronizer carried by one of the gears for causing the gears to assume the same speed as they are moved towards their meshing position, said synchronizer including a synchronizing gear mounted for rotary movement in mesh with the other gear and having a limited freedom of axial movement, a gear clutch between the synchronizer and the gear on which it is mounted and a control for shifting said synchronizing gear to cause said clutch to function.

5. In a gear transmission, the combination of a shaft, a power gear slidable thereon to and from a meshing position and provided with a pinion constituting one element of a toothed gear clutch, means between the power gear and shaft tending to resist axial movement of the gear, a synchronizer provided with a pinion constituting the coacting element of the clutch, a control means operatively connected to the synchronizer to move the same axially relative to the power member on which it is mounted and thus effect a clutching engagement between the synchronizer and the power gear on the initial part of its movement in shifting the power gear into its meshing position.

6. In a gear transmission, the combination of a shaft, a power gear slidable thereon to and from a meshing position and provided with a pinion constituting one element of a toothed gear clutch, a synchronizer provided with a pinion constituting the coacting element of the clutch, a control means operatively connected to the synchronizer to effect a clutching engagement between the synchronizer and the power gear on the initial part of its movement in shifting the power gear into its meshing position and resilient means for restoring the clutch into its normal inoperative position when released from the pressure of said control means.

7. In a device of the class described, the combination of a shaft, a pair of power transmitting gears, one of which is shiftable on said shaft to and from an intermeshing engagement with the other gear, means tending to retard the shifting of said gear, a synchronizer gear mounted for rotary movement on the shiftable gear in mesh with said other power gear and having a limited freedom of movement axially of the shaft, said synchronizer gear and said shiftable gear provided with a meshed gear clutch which when in operative position provides a direct positive drive between the shiftable power gear and the synchronizer gear and a single control means movable in one direction axially of the shaft for causing said clutch to become effective and for causing the shiftable gear to overcome said retarding means and thus permit the power gears to be moved into mesh.

8. In a device of the class described, the combination of a shaft, a pair of power transmitting gears, one of which is shiftable on said shaft to and from an intermeshing engagement with the other gear, a synchronizer gear mounted for rotary movement on the shiftable gear in mesh with said other power gear and having a limited freedom of movement axially of the shaft, said synchronizer gear and said shiftable gear provided with a meshed gear clutch which when in operative position provides a direct positive drive between the shiftable power gear and the synchronizer gear locking means between the sliding power gear and the shaft for securing the gear against accidental movement along the shaft and a single control means movable in one direction axially of the shaft for causing said clutch to become effective and for causing the power gears to be moved into mesh.

9. In a device of the class described, the combination of a power gear, a jack shaft gear adapted to be moved into meshing engagement, a synchronizer gear mounted for rotary movement relative to the power gear and in mesh with the jack shaft gear and a tooth clutch for connecting the power gear positively and promptly with the synchronizer gear thereby to jerk the jack shaft gear to the speed of the power gear through meshed gear-like drive before the power and jack shaft gears are moved into meshing engagement.

10. In a gear transmission, the combination of a transmission shaft, a power gear unit keyed to and slidably mounted on said shaft, said unit provided with means constituting a relatively fixed element of a synchronizer clutch, a synchronizer slidably mounted on said unit, free to rotate thereon and provided with means constituting the relatively movable element of said clutch, locking means between the unit and the shaft acting to interpose some resistance to the sliding movement of the unit, and control means operatively connected directly to the synchronizer to move the movable element of the synchronizer clutch positively in both directions parallel to the axis of the transmission shaft and acting therethrough when moved in one of said axial directions to overcome the resistance of the locking means and finally move the unit bodily along the shaft.

11. In a gear transmission, the combination of a transmission shaft, a gear unit slidable thereon, a synchronizer carried by the unit, a toothed gear clutch between the synchronizer and unit, a shift lever operatively connected to the unit to shift the same on the shaft, and to control the clutch, and locking means between the unit and shaft for locking the unit in shifted position and for resisting the movement of one of the clutch elements thereby to permit the coacting clutch element to be moved axially into operative engagement therewith.

12. In a device of the class described, the combination of a power gear, a synchronizer gear journalled thereon, a positive clutch drive between the power gear and the synchronizer gear and a corrugated metallic spring disposed between the elements of the clutch drive and providing a metallic friction clutch tending to synchronize the clutch elements prior to their moving into inter-engaging operative position.

13. In a device of the class described, the combination of a pair of power gears shiftable relative to each other to and from an intermeshing position, means for synchronizing the gears prior to their inter-engaging in meshing relation, said means including a synchronizing gear meshing with one of the power gears and a tooth clutch providing a positive non-slipping drive between the synchronizer gear and the other power gear.

14. In a device of the class described, the combination of a pair of power gears shiftable relative to each other to and from an intermeshing position, means for synchronizing the gears prior to their inter-engaging in meshing relation, said means including a synchronizing gear meshing with one of the power gears, a tooth clutch providing a positive non-slipping drive between the synchronizer gear and the other power gear and a spring between the elements of the tooth clutch tending to maintain the same in unclutched position and providing a frictional drive between the clutch elements as they are moved into operative position.

15. In a device of the class described, the combination of two rotary power members, means for causing the members to approach the same speed, said means including a positive clutch drive for transmitting rotary torque directly therethrough from one to the other power member and a resilient friction drive between the elements of the clutch drive for causing the elements of the clutch to approach the same speed prior to interengaging in their clutching relation.

Signed at New York city, in the county of New York and State of New York this 15th day of August, A. D. 1922.

HOWARD J. MURRAY.

Witness:
SARA A. THORNTON.